J. M. KYLE.
POWER TRANSMISSION DEVICE.
APPLICATION FILED JAN. 6, 1917.

1,250,903.

Patented Dec. 18, 1917.

Inventor,
Joseph M. Kyle, By
G. C. Kennedy
Attorney

UNITED STATES PATENT OFFICE.

JOSEPH M. KYLE, OF BUTLER COUNTY, IOWA.

POWER-TRANSMISSION DEVICE.

1,250,903. Specification of Letters Patent. Patented Dec. 18, 1917.

Application filed January 6, 1917. Serial No. 141,014.

*To all whom it may concern:*

Be it known that I, JOSEPH M. KYLE, a citizen of the United States of America, and a resident of Butler county, Iowa, have invented certain new and useful Improvements in Power-Transmission Devices, of which the following is a specification.

My invention relates to improvements in power transmission devices, and the object of my improvement is to furnish for any desired use, but more particularly for use in the mechanism of a tractor, a transmission device which shall be at once simple, inexpensive and effective in its operation.

Figure 1:
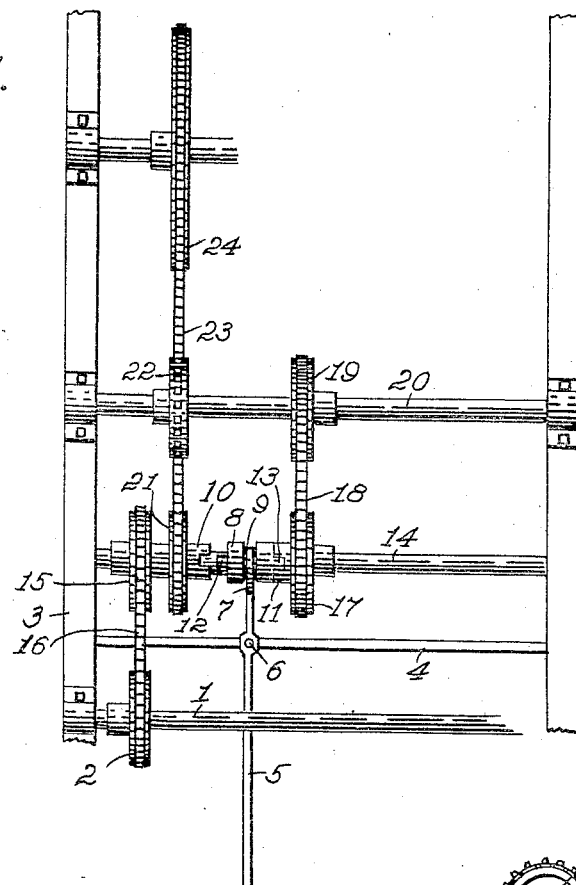
Figure 2:
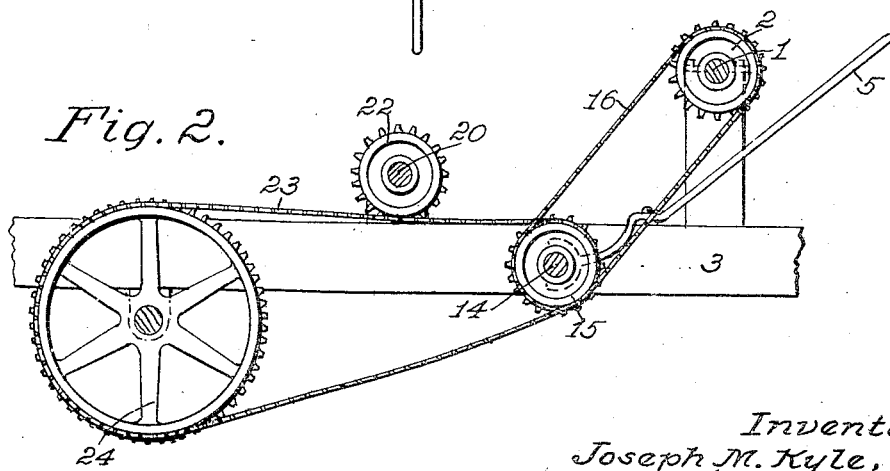

This object I have accomplished by the mechanism which is hereinafter described and claimed, and which is illustrated in the accompanying drawings, in which Figure 1 is a plan view of my improved power transmission device, and Fig. 2 is a side elevation thereof.

Similar numerals of reference denote corresponding parts throughout the several views.

Between parallel frame-bars 3 are mounted two rotatable shafts 14 and 20. The numeral 2 denotes a sprocket-wheel on a shaft 1, which latter may be rotated by a motor not shown.

On one end of the shaft 14 is fixed a sprocket-wheel 15, and a sprocket-chain 16 operatively connects the sprockets 2 and 15. Two like sprocket-wheels 17 and 21 are mounted loosely and non-slidably on the shaft 14 and are spaced apart. The opposed ends of the hubs 11 and 10 of said sprockets are formed with clutch-faces. On the shaft 14 between said hubs is mounted a sleeve 8 slidably non-rotatably and provided at either end with clutch-faces 12 and 13 to mate with the clutch-faces on said hubs alternately as the sleeve is moved in either direction.

The sleeve 8 has an annular groove 9 receiving movably a fork 7 on a hand-lever 5, the latter medially pivoted at 6 on a cross-bar 4 of said frame.

On the shaft 20 are fixedly mounted a pair of like sprocket-wheels 19 and 22 which are alined with the sprocket-wheels 17 and 21 respectively. A sprocket-chain 18 operatively connects the sprockets 17 and 19.

The numeral 24 denotes a rotatable sprocket-wheel, mounted in said frame, and which may be a member of a differential gearing. A sprocket-chain 23 is passed about the sprocket-wheels 21 and 24 and under the sprocket 22 to engage the under teeth of the latter.

When the lever 5 is shifted in one direction, it slides the clutch-sleeve 8 into engagement with the clutch-hub 10 on the sprocket 21, whereby the sprocket-chain 23 rotates the sprocket-wheel 24 direct ahead, the sprocket 17 remaining idle. When the lever is shifted in the opposite direction, the clutch is disengaged from the sprocket 21 which then runs idly, and is engaged with the other sprocket 17, the latter by the media of the sprocket-chain 18 and sprockets 19 and 22 causing a movement of the sprocket-chain 23 and the sprocket 24 in a reverse direction.

The power transmission device shown is very simple, made up of easily assembled and disassembled parts, and is adapted to be mounted on a tractor-frame for effective use to drive the traction-wheels.

Having described my invention, what I claim as new, and desire to secure by Letters Patent, is:

In combination, a driving shaft having fixed thereon a sprocket-wheel, a rotatable idler shaft, a driven sprocket-wheel mounted fixedly on said idler shaft, a sprocket-chain operatively connecting said sprockets, a pair of like sprocket-wheels mounted loosely non-slidably on said idler shaft and spaced apart, said pair of sprockets having hubs provided on their opposed ends with clutch-faces, a sleeve mounted slidably non-rotatably on said idler shaft between said clutch-hubs and having on opposite ends clutch-faces adapted to mate with the abutting clutch-hubs, said sleeve having an annular groove, a hand-lever, medially fulcrumed, and having a forked end with the fork movably seated in said annular groove, a second rotatable idler shaft, like sprocket-wheels fixed on said second idler shaft in line with the pair of sprockets on the first-mentioned idler shaft, a sprocket-chain operatively connecting one pair of the alined sprockets, a driven shaft having fixed thereon a differential sprocket-wheel in line with the other pair of alined sprockets, and a sprocket-chain passed about said differential sprocket under and operatively engaging teeth on the alined sprocket on the second idler shaft, and then passed about the other of the pair on the first-mentioned idler shaft.

Signed at Waterloo, Iowa, this 21st day of Dec. 1916.

JOSEPH M. KYLE.

Witnesses:
PEARL M. STANTON,
G. C. KENNEDY.

Copies of this patent may be obtained for five cents each, by addressing the "Commissioner of Patents. Washington, D. C."